US006796476B2

(12) United States Patent
Birk et al.

(10) Patent No.: US 6,796,476 B2
(45) Date of Patent: Sep. 28, 2004

(54) POWER CONTROL SYSTEM FOR A FRAMING TOOL

(75) Inventors: Daniel J. Birk, McHenry, IL (US); Paul D. Paluck, Orland Park, IL (US); Ted Singer, Barrington Hills, IL (US); Michael A. Reinhart, Lake Villa, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/241,177

(22) Filed: Sep. 11, 2002

(65) Prior Publication Data

US 2004/0045997 A1 Mar. 11, 2004

(51) Int. Cl.[7] .................................................. H02P 5/00
(52) U.S. Cl. ............................ 227/2; 227/10; 227/130; 227/119; 227/120
(58) Field of Search ............................ 227/2, 9, 7, 10, 227/129, 130, 156, 110, 119, 120

(56) References Cited

U.S. PATENT DOCUMENTS

| | | | | |
|---|---|---|---|---|
| 5,437,404 A | | 8/1995 | Shkolnikov | |
| 5,556,020 A | * | 9/1996 | Hou | 227/109 |
| 5,592,580 A | | 1/1997 | Doherty et al. | |
| 5,632,431 A | * | 5/1997 | Lin | 227/109 |
| 5,653,368 A | * | 8/1997 | Miles et al. | 227/2 |
| 5,653,371 A | * | 8/1997 | Hou | 227/109 |
| 5,695,108 A | * | 12/1997 | Lee | 227/109 |
| 5,752,643 A | | 5/1998 | MacVicar et al. | |
| 5,890,405 A | * | 4/1999 | Becker | 81/434 |
| 5,911,350 A | * | 6/1999 | Bolger et al. | 227/2 |
| 6,123,241 A | | 9/2000 | Walter et al. | |
| 6,267,284 B1 | * | 7/2001 | Clark | 227/8 |
| 6,382,492 B1 | | 5/2002 | Moorman et al. | |

FOREIGN PATENT DOCUMENTS

| | | |
|---|---|---|
| EP | 0 711 634 B1 | 3/1999 |
| EP | 1 375 075 A2 | 1/2004 |

* cited by examiner

*Primary Examiner*—Scott A. Smith
*Assistant Examiner*—Michelle Lopez
(74) *Attorney, Agent, or Firm*—Lisa M. Soltis; Mark W. Croll; Donald J. Breh

(57) ABSTRACT

A combustion power framing tool the invention has a nosepiece for driving fasteners, a housing and a combustion chamber that produces primary power held within the housing. A fastener supply, such as a magazine, is attached to the housing to supply the fasteners. The tool has detects a condition and produces a signal based on that condition, then causes the primary power to vary in relation to the signal, returning the primary power to full power following driving of the fastener.

18 Claims, 6 Drawing Sheets

POWER CONTROL SYSTEM FOR A FRAMING TOOL

CROSS REFERENCE TO RELATED APPLICATIONS

This application is related to U.S. Ser. No. 10/178,203 filed concurrently herewith, entitled "An Improved Fastener Supply and Positioning Mechanism for a Framing Tool"

BACKGROUND OF THE INVENTION

This invention relates to portable combustion powered fastener driving tools, and more specifically to a system for varying the power output to such a framing tool.

Portable combustion powered tools for use in driving fasteners into workpieces are described in commonly assigned patents to Nikolich, U.S. Pat. Nos. Re. 32,452; 4,403,722; 4,483,473; 4,483,474; 4,552,162; 5,197,646 and 5,263,439, all of which are incorporated herein by reference. Such combustion powered tools particularly designed for trim applications are disclosed in commonly assigned U.S. Pat. No. 6,016,622, also incorporated by reference herein. Similar condition powered nail and staple driven tools are available from ITW—Paslode under the IMPULSE® brand.

Such tools incorporate a generally pistol-shaped tool housing enclosing a small internal combustion engine. The engine is powered by a canister of pressurized fuel gas also called a fuel cell. A battery-powered electronic power control unit produces the spark for ignition, and a fan located in the combustion chamber provides for both an efficient combustion within the chamber, and facilitates scavenging, including the exhaust of combustion by-products. The engine includes a reciprocating piston having an elongate, rigid driver blade disposed within a piston chamber of a cylinder body.

A wall of the combustion chamber is axially reciprocable about a valve sleeve and, through a linkage, moves to close the combustion chamber when a workpiece contact element at the end of a nosepiece, or nosepiece assembly, connected to the linkage is pressed against a workpiece. This pressing action also triggers the introduction of a specified volume of fluid fuel into the combustion chamber from the fuel cell.

Upon the pulling of a trigger, which causes the ignition of the gas in the combustion chamber, the piston and the driver blade are shot downward to impact a positioned fastener and drive it into the workpiece. As the piston is driven downward, a displacement volume enclosed in the piston chamber below the piston is forced to exit through one or more exit ports provided at a lower end of the cylinder. After impact, the piston then returns to its original or "ready" position through differential gas pressures within the cylinder. Fasteners are fed into the nosepiece barrel from a supply assembly where they are held in a properly positioned orientation for receiving the impact of the driver blade. The fasteners are then propelled through the length of the barrel by the driver blade, exiting the barrel at the workpiece surface. Force of the driver blade and the momentum of the fastener drive the fastener to penetrate the workpiece.

There is considerable shock and vibration that is absorbed by the tool with each firing of the combustion chamber. Rapid movement of the piston within the cylinder due to the expansion of combustion gases and the force of the driver blade on the workpiece tend to propel the tool away from the fastener as it is driven into the workpiece. Immediately following firing of the tool, the hot, expanded gases are purged from the combustion chamber, the combusted gas remaining in the cylinder rapidly contracts, drawing the driver blade back up into the tool within a fraction of a second, tending to recoil and propel the tool in the opposite direction. These forces put large stresses on the housing and all parts of the tool, causing wear where materials flex or parts abrade on each other.

Stresses as described above are particularly acute when short fasteners are driven by the tool. In many framing application, long nails are used predominantly. When driving long nails, more of the force from the power source and exerted through the driver blade is absorbed by the nail as it penetrates the workpiece. As the fastener is driven deeper, additional force is needed to overcome friction between the fastener and the workpiece as the surface area between the two surfaces increases. Short fasteners require less force to completely penetrate the workpiece, so the excess power is absorbed by both the user and the tool. In the extreme, a blank fire, whereby the tool is fired when no fastener is present to absorb any of the shock, puts tremendous stress on the tool, possibly shortening the useful life of the tool.

Control of energy output to a combustion-powered tool is disclosed in U.S. Pat. No. 5,592,580 to Doherty et al., herein incorporated by reference. A voltage divider includes a settable resistance, either a potentiometer or two parallel, fixed resistances that can be alternatively selected, and is used to provide a setpoint voltage. This patent also discloses changing the fan speed in response to light transmission between a phototransmissive diode and a photoreceptive transistor. Thus, it discriminates between fasteners of various lengths, and selected the voltage to the fan depending on the position of the photoelectric switches.

However, reduction in fan speed alone has been unsuccessful in producing a tool that fires consistently at low power. Use of the fan to exhaust the combustion products serves two primary purposes. It produces turbulence in the vicinity of the combustion chamber, promoting heat transfer to cool the tool after firing, as well as mixing of the combustion gases with fresh, oxygenated air. Mere reduction in the fan speed limits both the cooling and replenishment of oxygen in the combustion chamber. When combustion products remain in the combustion chamber in the subsequent combustion cycle, the fuel-to-air ratio may become difficult to control. After several firings, tools running at a low fan speed can have insufficient oxygen to support combustion.

The use of a metering valve to control the flow of fuel into the chamber is disclosed in U.S. Pat. No. 5,752,643 to MacVicar et al. and in U.S. Pat. No. 6,123,241 Walter et al. This invention teaches the use of the metering valve to control the fuel-to-air ratio more precisely to improve the efficiency of combustion. However, use of metering valves with high pressure fluids used in very small quantities are difficult to control.

Thus, there is a need in the art for a power framing tool that is able to efficiently reduce the primary power expended when short nails are in use. There is also a need for a tool that varies the power expenditure automatically, without the need to change settings or switches by the user. In a tool that varies the primary power by changing the fan speed, there is an additional need for an improved system for evacuating the combustion gases following combustion so that they do not build up, interfering with proper fuel to air ratios for efficient combustion.

SUMMARY OF THE INVENTION

These and other needs are met or exceeded by the present invention which features an improved system for automatically adjusting the power output of a framing tool based upon the length of the fastener.

More specifically, the invention relates to a combustion power framing tool having a nosepiece for driving fasteners, a housing and a combustion chamber that produces primary power held within the housing. A fastener supply, such as a magazine, is attached to the housing to supply the fasteners. The tool has detects a condition and produces a signal based on that condition, then causes the primary power to vary in relation to the signal and returns to full power following driving of the fastener.

A method includes passing the fasteners past a detector in the tool, detecting the length of the fastener and producing a signal from the detector based on the length of the fastener. After passing the detector, the fasteners are urged through the magazine to a channel and the workpiece contact element is engaged by contact with the workpiece. The primary power varies in relation to the signal when the workpiece contact element is engaged. Combustion of the fuel in the combustion chamber causes driving the fastener into the workpiece at a power level relative to the length of the fastener. Following driving of the fastener, primary power level is returned to full power.

Use of the tool or method described above allows the power of a framing tool to be reduced prior to and during firing of the tool, yet does not allow combustion gases to build up in the combustion chamber. The latter condition makes it difficult to control the air-to-fuel ratio. Under the present method and apparatus, the tool fires consistently and maintains a reasonably consistent power output at least two different power levels. Variation in the speed of the fan provides an easy method of controlling the power from the combustion chamber by varying the power to the fan motor.

Further, the present method and apparatus also automatically adjusts for the length of the fastener. A detector on the tool provides an signal as to the fastener length that is used to vary the power. The tool is saved from wear and tear due to stresses absorbed when small fasteners or blanks are fired. Reduction of power reduces the strain on materials that flex or abrade on each other when fired. Nor is it convenient for the user to have to remember to change a setting or manual lever when changing to a magazine with differently sized fasteners.

DETAILED DESCRIPTION OF THE INVENTION

Figure 1:
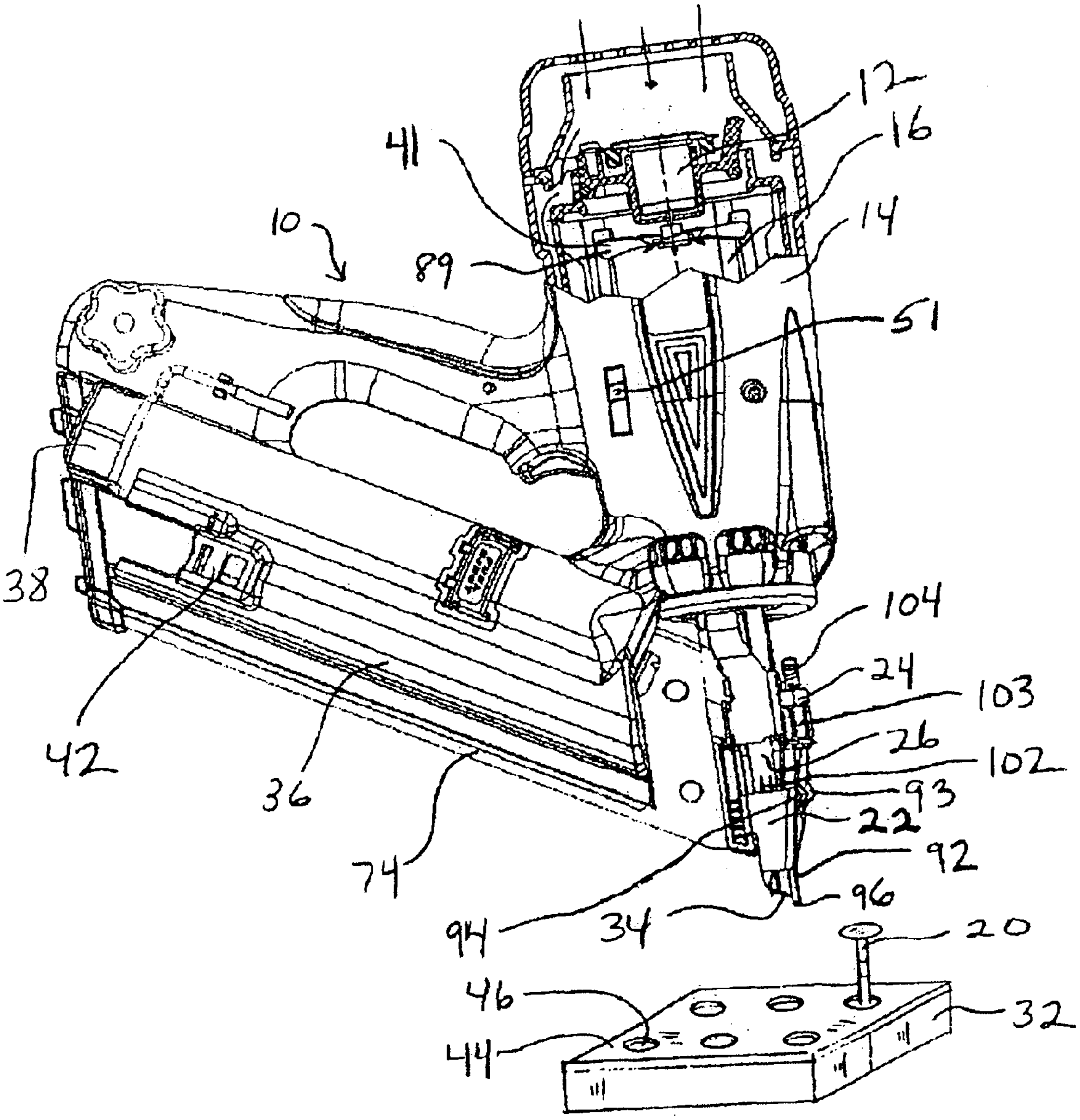
FIG. 1 is a perspective drawing of the present framing tool, with a portion of the housing cut away to show the fan and combustion chamber.

Referring to FIG. 1, a power framing tool, generally designated 10, is designed to utilize a plurality of primary power levels from a combustion by reducing the secondary power to a fan motor 12 prior to firing of the tool, then returning the fan motor to full power immediately following combustion. The power framing tool 10 for use with the present power control system includes a housing 14 and a combustion chamber 16, that produces primary power to drive fasteners 20, held within the housing. A workpiece contact element 22, adjustably threadable to a threadable adjustment mechanism 24 on a nosepiece 26, moves to close the combustion chamber 16 through a linkage (not shown) when the workpiece contact element 22 is pressed against a workpiece 32. The fasteners 20 are fed to a channel 34 at least partially defined by the nosepiece 26 from a supply assembly 36, such as an attached magazine. A power control system, the interchangeable nosepiece 26 and components of the work contact element 22 enable the tool 10 to be converted conveniently for use with a plurality of different types of fasteners 20. Directional references used herein are to be interpreted when the tool 10 is oriented as in FIG. 1 and are not intended to limit the invention in any way.

Figure 2:
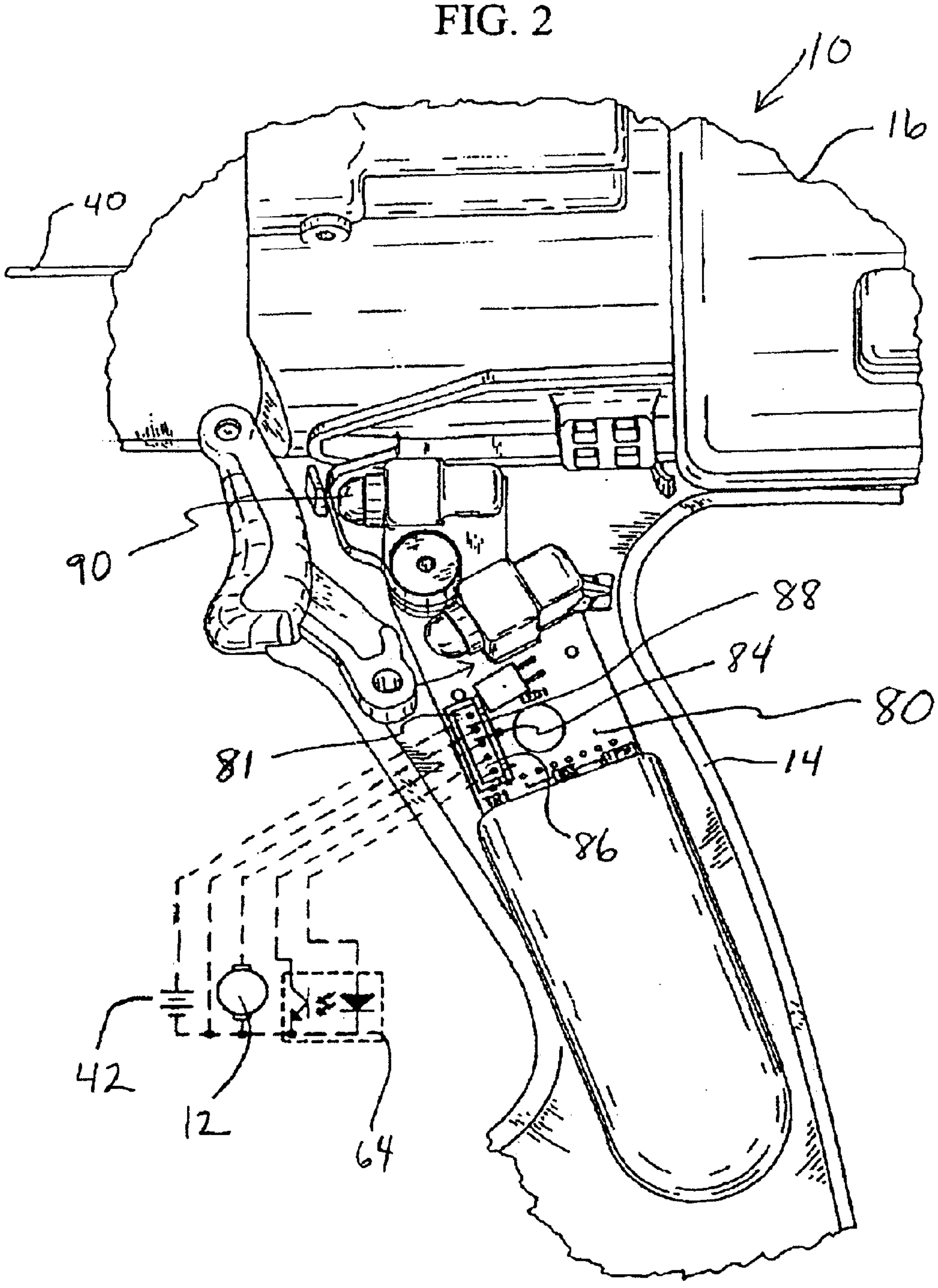
FIG. 2 is a fragmentary side view of a portion of the circuit board of the tool of FIG. 1, with the electrical connections to the battery, the fan motor and magazine sensor represented schematically.
Figure 6:
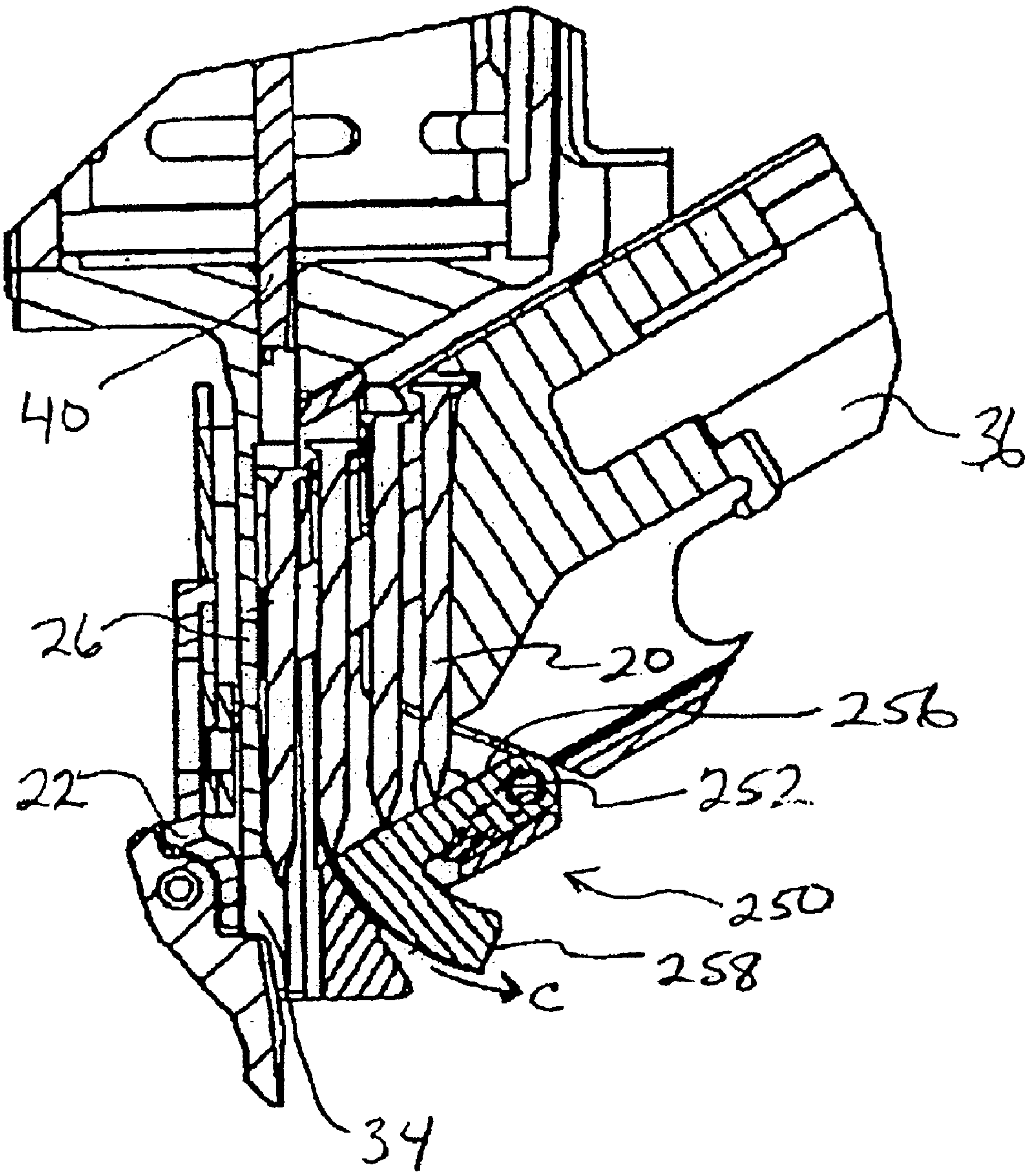
FIG. 6 is a fragmentary, vertical cross-sectional view of a magazine and nosepiece showing an alternate embodiment of the detector.

Referring now to FIGS. 1, 2 and 6, fuel is provided to the combustion chamber 16 from a fuel cell 38 and mixed with air in an appropriate ratio. When the tool 10 is fired, the mixture in the combustion chamber 16 is ignited and rapidly burned, generating carbon dioxide, water vapor and other gases under high pressure. The gases push on a piston (not shown), pushing it downward and driving an attached driver blade 40 to contact a fastener 20 in the channel 34 and expel it from the channel. Following combustion, the spent combustion gases are purged from the combustion chamber 16 in preparation for the next firing using a fan 41 driven by the fan motor 12, which is powered by a secondary power source, such as a battery 42, in the vicinity of the combustion chamber.

The present power control system automatically varies the primary power to the tool 10 prior to driving the fastener 20 and returning to full primary power following driving of the fastener, whereby the primary power varies in relation to the driving conditions. Where the driving conditions suggest that full primary power is needed to drive the fastener 20 into the workpiece or substrate 32, the fan motor 12 is maintained at full secondary power. The fan motor 12 is reduced so that the primary power will be reduced upon firing where the driving conditions so suggest. “Driving conditions” are intended to refer to any condition that would affect the amount of primary power needed to fully drive the fastener 20 into the workpiece 32. A fastener condition relating to the fastener 20 and an environmental condition relating to the workpiece 32 or environment are common driving conditions, however, it is contemplated that other conditions exist which are suitably used with this invention. Primary power is also suitably varied in response to a combination of two or more of the conditions.

The most common fastener conditions include the length of the fastener 20, the type of fastener, the fastener width of diameter, the head design, the shape of the shank, whether or not the shank is ringed, the presence of a coating on the fastener and the point style. Each of these features of the fastener 20 contributes to how much primary power is needed to drive the fastener fully into the substrate.

The absence of the fastener 20 from the channel 34 is another fastener condition, for example where the magazine 36 jams or the driver blade 40 does not return to its original position. Inadvertent blank firing of the tool 10 can occur or the tool can be fired purposely to clear the misfire. Detecting the absence of a fastener 20 and reducing the primary power prior to a blank fire limits the amount of vibration that the tool 10 must absorb when there is no fastener in the channel 34.

Several different types of fasteners 20 are used with power framing tools 10. Frequently, the fasteners 20 are nails having round heads, square heads or clipped head nails, also known as "D" shaped heads. For the fasteners 20, the use of the nails with either the heads centered or offset on a shank are contemplated. Offset, round head or clipped nails are a first type of fastener 20 that is commonly used in framing, i.e., when directly connecting two pieces of wood. A second type of the fastener 20, used frequently with metal strapping or support brackets 44 having prepositioned openings 46, is a full round head, hardened nail, such as Positive Placement® nails by ITW—Paslode, a division of Illinois Tool Works Inc. of Glenview, Ill. These two fastener types are discussed herein as examples of the fasteners 20 with which this invention is used, and are not intended to limit this invention, in that any type of fastener which may be driven by the tool 10 is suitable for the present invention.

Discrmination between the fasteners 20 that are driven with full primary power compared to those driven with reduced power is determined by one or more fastener conditions. For most framing situations, 1½ inch nails 20 can be driven with approximately 50% primary power compared with nails of about 2½ to 3 inches. For convenience of discussion, 1½ inch nails are referred to as short fasteners 20 while 2½ to 3 inch nails are known as long fasteners. For the purposes of this discussion, only two fastener lengths, short and long, will be considered, however, even where a single condition is being detected, such as fastener length, it is contemplated that any number of distinctions in that condition be detected, including a continuous spectrum of values.

Figure 3:
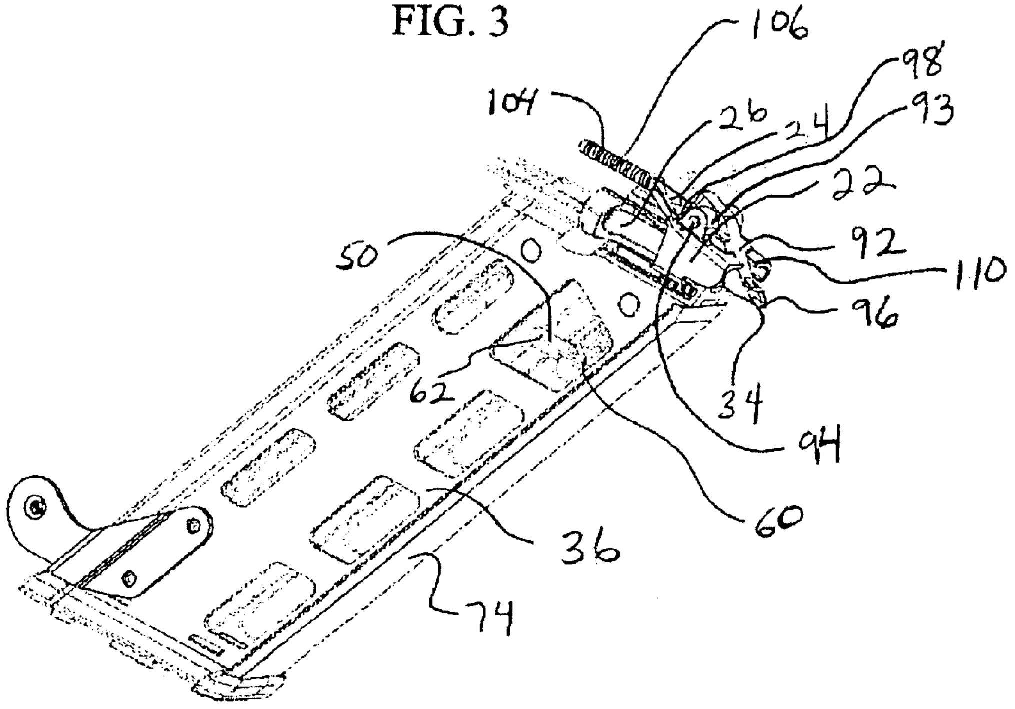
FIG. 3 is a perspective view of the magazine, nosepiece and workpiece contact element.

Turning to FIG. 3, one or more detectors 50 senses one or more of the conditions of the fastener 20 or the environment that are determinative of a variation of the primary power. Where more than one property is being detected, a single detector 50 is suitable for detecting two or more properties in some circumstances, however, it is also suitable to include the separate detector 50 for each of the properties. The detector 50 need not automatically sense the presence of a condition directly from the fastener 20 or the environment. In one embodiment, the detector 50 is suitably a switch 51 (shown in FIG. 1) set by the user. For example where primary power varies by the composition of the workpiece, the switch 51 is located on the tool housing 14, and is suitably set to drive fasteners into soft wood, hard wood, concrete or other types of workpiece. In an embodiment where the magazine 36 is removable, properties of the fastener 20 are coded into the magazine, then detected by the tool 10. It is contemplated that two or more detectors would be combined in a sophisticated tool that detected multiple conditions and made power adjustments accordingly.

Another embodiment of the detector 50 is where the recoil of the tool 10 is measured and used to determine the primary power to be used on subsequent firings. This technique indirectly adjusts for any fastener or environmental condition that leads to excess primary power that is absorbed by the tool 10. A feed back loop is used to vary the primary power based on the previous one or more measurements of the recoil detector 50.

In yet another embodiment, the detector 50 is mechanical, such as a pivoting lever. The lever 50 is selectively displaced depending on the length of the fastener 20. While several suitable mechanical detectors 50 are discussed in detail below, this invention is not to be construed as to being limited to mechanical detectors 50. Optical detectors, infrared detectors, magnetic, sonic, or any other type of detector 50 is suitable that can determine when the condition is present that is determinative of variation in primary power. Any of the detectors 50 are useful to detect conditions either directly or indirectly. For example, an optical detector 50 is used to either directly determine a property of the fastener 20, such as its length or width, or the optical detector is used to read a bar code on the tape holding a plurality of the fasteners 20 together.

The lever-type detector 50 discussed above is shown in detail in FIGS. 4 and 5. The detector 50 includes a lever arm 52 and a pin 54. A pivot ring 56 surrounds the pin 54 and provides a point about which the lever arm 52 freely rotates. Projecting from one side of the pivot ring 56, there is an actuating arm 60 supporting an offset plate 62. The plate 62 is in registry with, and contacts a sensor 64 on the tool 10. Opposite the actuating arm 60 is a sensing arm 66, which includes a channel face 70 and a positioning face 72. At least a portion of the positioning face 72 extends into the path of the long fasteners 20. The lever arm 52 is positioned at a bottom 74 of the magazine 36 so that all of the fasteners 20 easily pass over the actuating arm 60 as they move toward the channel 34. A top surface 76 of the sensing arm 60 slopes upwardly toward the fasteners 20 from the pivot ring 56 to the channel face 70. The maximum height of the sensing arm 60 at the channel face 70 is governed by the predetermined length of the fastener 20 that the detector 50 is intended to distinguish. The sensing arm 60 of this embodiment must be tall enough to contact the- fastener 20 of a predetermined length as it passes over the lever 52.

Figure 4:
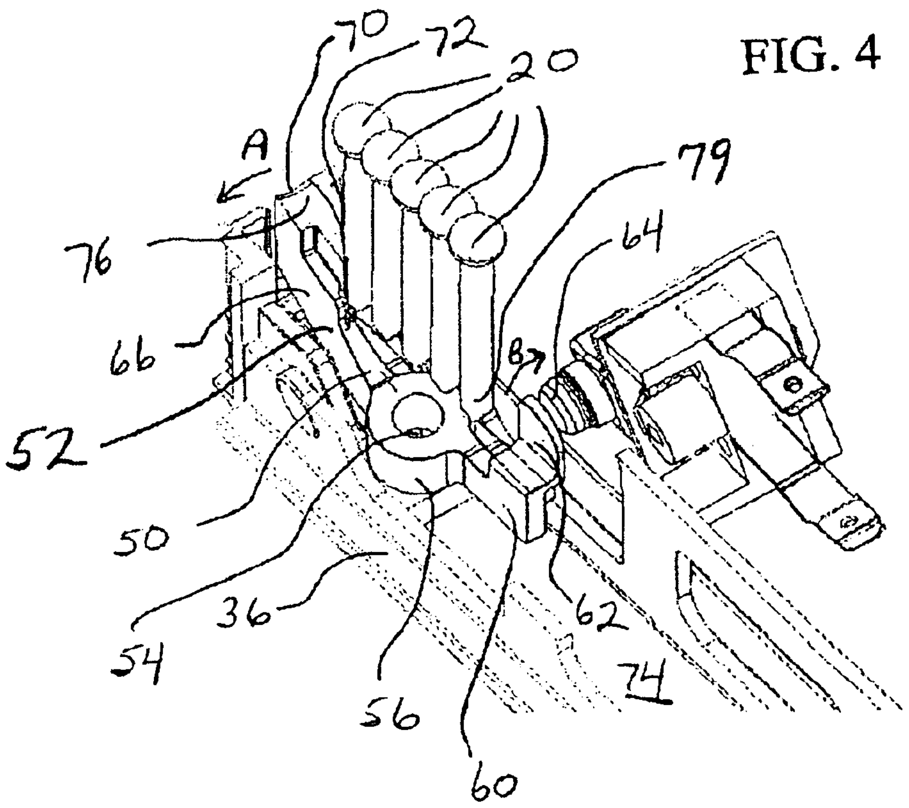
FIG. 4 is a fragmentary view of a portion of the magazine and the sensor showing the interaction between the lever and the sensor, with the lever in the first position.

As seen in FIG. 4, the lever 52 is in a first position. When the sensor 64 is a push button that is biased toward the magazine 36, the biasing force generated by the button holds the lever 52 in this position. Optionally, the button 64 is shielded by a strip of spring steel (not shown) between the button and the magazine 36. The strip protects the button 64 during installation and removal of the magazine 36 and provides an additional biasing force toward the magazine if needed. In this position, the short fasteners 20 pass over the lever 52 entirely and enter the channel 34 without contacting the lever.

However, when long fasteners 20 are used, a portion of the fastener contacts the positioning face 72 of the lever 52, moving it to a second position. A lower portion 79 of the fastener 20 pushes against the positioning face 72 of the sensing arm 66, caused it to pivot in the direction indicated by arrow A. In this position, the channel face 70 moves from blocking a portion of the channel 34, to a position allowing the long fasteners 20 to pass. Pushing the sensing arm 66 in direction A causes the lever 52 to pivot about the pin 54, pushing the actuating arm 60 in the opposite direction as indicated by arrow B. This movement pushes the plate 62, which is already in registry with the button 64, against the button, overcoming the biasing force exerted by the button against the plate and causing it to be actuated.

A second embodiment 250 of the detector is seen in FIG. 6. Working in basically the same fashion as the detector 50 of FIGS. 4 and 5, the detector 250 moves in a direction C, pivoting about a point 252 on one end of the detector rather than a central pivot point. In this case, the detector 250 is spring biased upward, toward the fasteners 20. The short fasteners 20 do not move the detector 250, leaving the detector in a first position. But when the long nails pass by it, they push the sensing face 256 of the detector 250 down to a second position shown in FIG. 6. The sensor 64 (not shown) occupies any suitable location where it can be actuated by the detector 250. Preferably, the sensor 64 is located below the first position of the detector 250, so that it is triggered by an actuating face 258 of the detector when the it moves from the first position to the second position.

In yet a third embodiment (not shown), alternate yet equivalent of the detector 50, the detector pivots about a point and rotates, but the actuating face operates a cam linkage to a plate. The cam linkage transforms movement of the detector through the vertical plane to lateral motion by the plate, so that depression of the detector by long nails causes the sensor button to be depressed by the plate.

Referring to FIGS. 2 and 4, the detector 50 sends a signal to communicate to the sensor 64 information in response to the length of the fastener 20 in the magazine 36. The sensor 64 then communicates the fastener length to a spark unit 80. It is contemplated that the absence of a signal is one particular type of signal. Suitable types of the signal generating devices that are useful with this type of invention include mechanical linkages, electrical signals, optical signals, sounds, and the like. In the embodiment of the tool 10 shown here, the detector 50 is the lever 52 that is biased to a first position by the button 64 and rotates to a second position when the fasteners 20 are at least a predetermined length. The position of the lever 52 depresses the button 64 to produce a signal that has a first value when the button is not depressed and has a second value when the button is depressed. In moving from the first position to the second position, the detector 50 depresses the button 64, causing a change in the electrical circuit that depends on whether the button 64 is depressed or not. Thus, when short fasteners 20 are being used, the signal has the first value, but if the fasteners are long, the signal changes to the second value.

It is to be understood that fastener length is not the only factor that determines the power required to fully drive the fastener 20 into the workpiece 32 (FIG. 1). In this discussion, a full primary power and a reduced primary power of approximately 50% of full power are discussed for simplicity. However, it is to be understood that many other primary power levels are suitable for use in this invention, either as placement for or in addition to those disclosed above. Additional primary power is needed when driving fasteners 20 into hard woods or pressure treated wood compared to soft wood. Some fasteners 20, such as ringed nails, require more primary power to drive. It is contemplated that the distinction between the power generated at fill primary power and the power generated at one or more reduced power settings is dependant on the application for which the tool is intended and the materials to be used. Use of a continuous, but not necessarily linear, primary power reduction is also contemplated.

It is also contemplated that the use of some fastener types will not necessitate varying the primary power output from the tool as the fastener length changes. In this case, it is contemplated that magazines 36 for this particular fastener type will not have a detector, and the magazine will have a solid panel that holds the button depressed at all times.

Although the power control system is used most advantageously with a tool having removably attachable magazines 36, it is also contemplated that the power control system is useful with a fixed magazine. The detector 50 reacts to the fastener length whether the magazine 36 is physically changed or fasteners 20 are added to a permanently mounted magazine.

Once the desired reduced primary power level is chosen as discussed above, a fan speed is determined to produce the desired power level. Primary power varies directly, but not necessarily linearly, with fan speed until full power is reached. When there is complete mixing of the air and fuel and the spent combustion gases are essentially completely evacuated from the combustion chamber 16 following combustion, increasing the fan speed generates little or no significant increase in primary power. The fan speed changes somewhat as the battery discharges. One average reduced fan speed is suitable for use over the whole battery cycle, or, preferably, the fan speed can fluctuate with the battery charge.

Referring back to FIGS. 1 and 2, the fuel and the air are added to the combustion chamber 16 in an appropriate ratio prior to combustion when the workpiece contact element 22 is engaged upon the workpiece 32 and the tool 10 is depressed prior to firing. The fuel is supplied to the tool 10 from the fuel cell 38, and then flows to a metering valve (not shown), through a fuel line (not shown) and into the combustion chamber 16. The fan 41, powered by the fan motor 12, generally located on a side of the combustion chamber 16 opposite the driver blade 40, draws air in and promotes turbulence. When the combustion chamber 16 is closed, turbulence mixes the gases contained therein, encouraging them to burn more efficiently. Continued movement due to momentum of the fluids during combustion propagates the flame front more quickly. Thus, low fan speeds, after engagement of the workpiece contact element 22, while the fuel and air are being mixed, but prior to combustion, reduce the primary power from the combustion chamber 16 by reducing the efficiency of combustion.

Following combustion, however, it is important to evacuate the spent combustion gases from the combustion chamber 16. Immediately following combustion, the fan speed is returned to full primary power for an evacuation period in preparation for the subsequent cycle of mixing and combusting of fuel. Preferably the evacuation period is from one to about five seconds in length, however, a wide range in the evacuation periods is contemplated. The evacuation period need not be a fixed length, but can last until the subsequent engagement of the workpiece contact element 22. One embodiment of the invention utilizes an evacuation period between one and three seconds.

Figure 8:
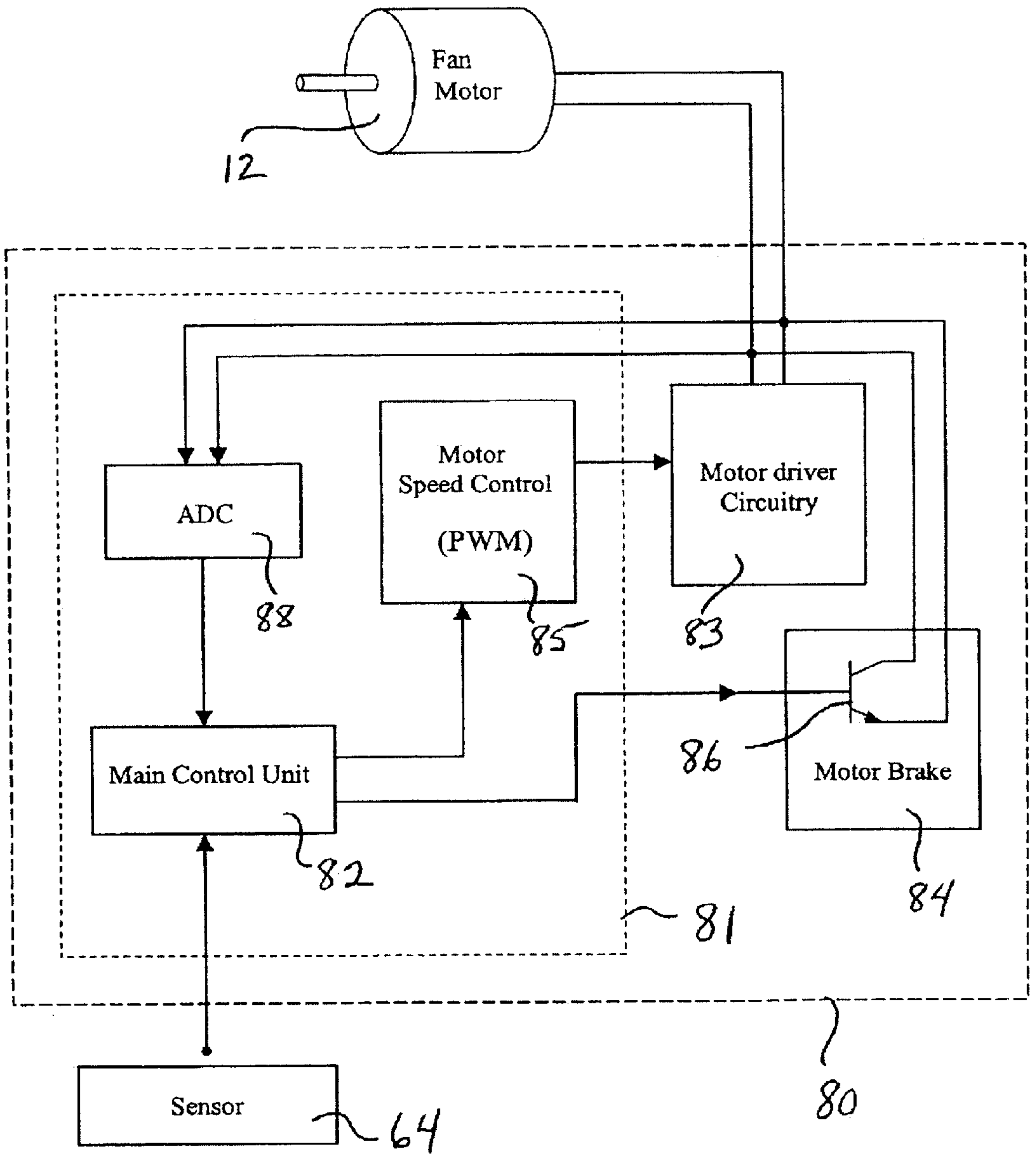
FIG. 8 is a block diagram of the spark unit.

Referring to FIG. 8, the spark unit 80 provides the spark needed for combustion and performs other functions, including controlling the speed of the fan motor 12. A controller 81 having a main control unit 82 is optionally housed in the spark unit 80, as are a fan motor driver circuit 83 and an optional braking system 84. The controller 81 adapts the output to the fan motor driver circuit 83 and the braking system 84 in response to the signal from the sensor 64, as will be discussed in greater detail below.

Quick reduction in speed of the fan 41 is accomplished using the optional braking system 84. Any method of lowering resistance to the fan motor 12 sufficient to provide braking action is contemplated for use as the braking system 84. One embodiment of the braking system 84 includes a transistor 86 wired across the fan motor 12 that introduces a low resistance to the output from the motor driver circuit 83 sufficient to provide braking to the motor when the transistor is activated. Selection of the appropriate transistor 86 will be obvious to those skilled in the art. In place of the transistor 86, a relay (not shown) could also be used to provide an alternate circuit path around the fan motor 12.

It is also contemplated that the length of the evacuation period not be used to slow the work pace of the user. If the workpiece contact element 22 is engaged upon the workpiece 32 prior to the expiration of the evacuation period, the braking system 84 is used to immediately reduce the fan speed after a shortened evacuation period.

Once the fan motor 11 reaches the desired speed, the speed is maintained at a lower level by a motor speed controller 85 reducing secondary power to the fan motor 12. The motor speed controller 85 uses any method of reducing secondary power to a DC motor that is suitable, including reduction in the voltage or pulsing power to the motor, turning it on and off in rapid bursts to achieve the average desired fan speed. Use of resistance to alter the fan speed is contemplated, by selection of two or more parallel resistances. Pulse modulation, either pulse width modulation or pulse position modulation, is the preferred method used by the motor speed controller 85 to maintain low speed.

If, as preferred, the controller 81 is an electronic microcontroller, execution of a software program stored in the microcontroller is one way of operating the motor speed controller 85 to modulate the secondary power to the fan 41 based on the signal, and applying the braking system 84. The use of microcontrollers 81 is well known to artisans for such uses. The secondary power to the fan motor 12 is output from the motor speed controller 85, while information as to the fan speed is input to the main control unit 82 from an Analog to Digital Converter ("ADC") 88. The ADC 88 is preferably built into the controller 81, but use of a stand alone ADC is also contemplated.

A set of simple instructions in the form of programming in the microcontroller 81, directs the microcontroller how and when to vary the secondary power to a fan 41. A discussion of one possible instruction set is discussed below to exemplify one embodiment of this control system, however, it is to be understood that many such instruction sets are possible, and many variations in this control scheme will be obvious to those skilled in the art of designing control systems. The exemplary control system disclosed below varies the secondary power duty cycle based on the battery voltage and includes the optional braking system 84. Numerical values are provided, such as the fan speed, times and frequencies, are given as an example only and are not intended to limit the invention. The number, size and shape of fan blades 89 (FIG. 1) will contribute to the number of revolutions per minute necessary to produce a given turbulence and the time needed to increase or reduce fan speed. The size and shape of the combustion chamber 16 and the amount of fuel used per charge determines how much turbulence is needed to evacuate the combustion chamber 16. The exact electronics of the microcontroller 81 affects the frequency of the pulse width modulation.

Continuing to refer to FIGS. 2 and 8, the microcontroller 81 of this embodiment has internal components for the analog to digital converter ("ADC") 88 and the motor speed controller 85 in the form of Pulse Speed Width modulated output ("PWM"). Adjusting the duty cycle of the PWM controller 85 controls the fan speed. PWM output runs at 7843 Hz (127.5 i S) and can be adjusted in 0.5 i S (0.4%) steps. The PWM duty cycle is increased as the battery voltage goes decreases to maintain a constant fan speed. Target PWM output is 5.5 i S for 3000 RPM and 6.0V or 2.0 i S for 1500 RPM at 6.0V.

Speed of the fan motor 12 is sensed by turning off secondary power to the motor and measuring the voltage generated by the motor using the ADC 88. A target voltage is the voltage read by the ADC 88 when the fan 41 is rotating at the target speed to achieve the desired reduced primary power setting. The target motor voltage in this embodiment is 1.4V for 3000 RPM or 0.7V for 1500 RPM. During start and braking, a lower motor voltage target is used to compensate for overshoot on start up and undershoot on braking.

When starting the fan motor 12 in slow speed from a stop, nominal pulse width modulated duty cycle is calculated based on the battery voltage. DC power is applied to the fan motor 12 for 12 mS. If the motor voltage is under 20% of the battery power, the motor resistance is sufficiently low to provide braking action and operation is halted. Thereafter, 4 mS testing loop begins whereby the secondary power to the fan motor 12 is turned off for 165 i s and the motor voltage is read from the ADC 88. If the motor voltage is greater than or equal to the target voltage, then this loop is exited, otherwise DC power is restored to the fan motor 12 and another iteration of the loop begins. When the target voltage has been reached, pulse width modulation begins using the duty cycle calculated based on the battery voltage.

Optionally, there is a first shot delay time within which the tool 10 is normally fired. There is an optional provision in the testing loop to stall the fan 41 and halt operation if the first shot delay time is reached before the fan reaches the target speed. This is a safety feature that shuts down operation if the fan 41 does not begin turning for any reason.

Referring again to FIGS. 1 and 2, engagement of the workpiece contact element 22 depresses an interlock switch 90 that prevents fuel gas from being introduced into the combustion chamber 16 and preventing firing of the fastener 20 unless the tool 10 is in contact with the workpiece 32. When the interlock switch 90 is depressed far enough, it triggers the introduction of fuel gas into the combustion chamber 16, and mixing of the fuel and air begins. Engagement of the interlock switch 90 is a convenient method of triggering reduction in the fan speed if the sensor 64 is released, indicating that reduced primary power is advantageous.

While the fan 41 is running at the reduced speed, the fan speed is checked every 246 mS to by the controller 81. To check the speed, the secondary power output to the motor 12 is turned off, and the voltage of the motor 12 is sampled using the ADC 88. If the motor voltage is less than 5% of the battery capacity, the motor 12 is stalled and operation is halted. If the ADC 88 reading is within two counts of the target voltage, there is no change in the duty cycle. However, if the ADC 88 reading is more than two counts above or below the target value, the duty cycle is increased or decreased, as appropriate, to bring the fan motor speed toward the target value. Following any needed adjustments, secondary power output from the controller 81 to the motor 12 is resumed.

When the fan speed is reduced from full speed to the reduced speed, the optional braking system 84 is employed. The fan motor 12 is turned off, and the PWM duty cycle is calculated based on the reduced fan speed. The brake transistor 86 is activated for 160 mS, a low resistance is introduced sufficient to provide braking action o the fan motor 12. A second testing loop is employed to determine when the target brake voltage has been reached. Every 4 mS, the brake transistor 86 is turned off for 165 mS, and then the motor voltage is read using the ADC 88. If the motor voltage is less than the target brake voltage, the controller 81 exits this loop, otherwise, the brake transistor 86 is turned on again and another iteration of the loop begins. Optionally, there is a time limit to end the loop if the target motor voltage has not been reached within a reasonable time. After the target motor voltage has been reached, the PWM motor output begins using the nominal PWM duty cycle.

Figure 7:
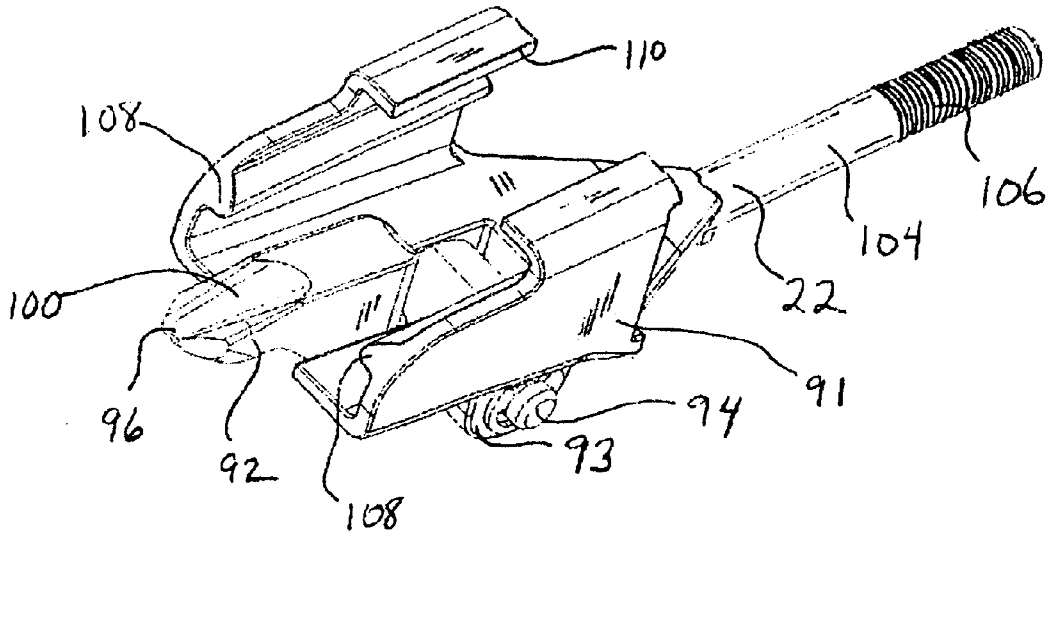
FIG. 7 is a bottom perspective view of the workpiece contact element.

Referring now to FIGS. 1, 3 and 7, when using fasteners 20 that benefit from precise. placement in the workpiece 32, such as when the metal bracket 44 with the openings 46 are used, the workpiece contact element 22 has a housing 91, a swiveling probe 92 and a support 93 for a pivot pin 94. Swiveling of the probe 92 about the pivot pin 94 allows it to pivot relative to the housing 91 along a radius from the longitudinal axis of the channel 34. The probe 92 depends from the workpiece contact element 22, and has a tip 96 engagable with the workpiece 32, and a stop surface 98 (FIG. 3). The tip 96 has a groove 100 to guide the fasteners 20 into the workpiece 32. Insertion of the tip 96 into one of the openings 46 and depression of the tool 10 engages the workpiece contact element 22.

Upon firing of the tool 10, the fastener 20 exits the channel 34 and contacts the groove 100 of the probe 92. The lower end 79 of the fastener 20 (FIG. 4) travels down the groove 100 and into the opening 46 in the workpiece 32 immediately beside the position where the probe 92 is located.

As the fastener 20 enters the workpiece 32, it pushes the probe 92 out of the opening 46, allowing the head of the fastener 20 to pass the position where the probe was located without jamming. When the probe 92 is pushed out of the opening 46, the rotating arm 96 pivots about the pivot pin 94 until the stop surface 98 contacts the workpiece contact element 22, limiting movement of the rotating arm. Motion of the probe tip 96 is limited along a radius from a longitudinal axis of the channel 34. The pivotable probe 92 preferred for use with this invention is disclosed in U.S. Pat. No. 5,452,835 to Shkolnikov, herein incorporated by reference.

The workpiece contact element 22 with the probe 92 has been made easily interchangeable in the tool 10 through its engagement with the threadable adjustable mechanism 24. A first alignment mechanism 102 (FIG. 1) on the nosepiece 26 is configured for engagement with the workpiece contact element 22. One embodiment of the threadable adjustable mechanism 24 is a threaded adjusting barrel member 103 on the nosepiece 26. A threaded member 104, such as a screw, extends from the workpiece contact element 22 diametrically opposite the probe 92 and engages with the threadable adjustable mechanism 24. The barrel 103 of the threadable adjustable mechanism 24 is rotatable upon engagement with threads 106 of the threaded member 104. When the threaded member 104 is aligned with the threadable adjustable mechanism 24 and the barrel 103 is rotated, the rotational motion is converted to linear motion of the workpiece contact element 22, allowing the workpiece contact element 22 to be securely attached to the nosepiece 26 at an appropriate height.

The workpiece contact element 22 also includes a second alignment structure 108 configured for slidingly engaging the first alignment mechanism 102 on the nosepiece 26. Any first and second alignment structure 102, 108 is contemplated for maintaining alignment between the workpiece contact element 22 and the nosepiece 26 after numerous firings of the tool 10. Forces generated by movement of the probe 92 radially away from the channel 34, and the general recoil of the tool 10 following firing, tend to move the workpiece contact element 22 relative to the nosepiece 26. These forces will have the greatest effect when there is a large moment arm between the area where the force is applied and the area where the workpiece contact element 22 is secured, as when the threadable adjustable mechanism 24 and threaded member 104 are on opposite sides of the workpiece contact element 22 from the probe 92. Preferably, the first and second alignment structures 102, 108 are a tongue and groove, a boss and a cover, a pin and a channel, a pair of abutting shoulders, a capturing system or any other system for maintaining alignment between the nosepiece 26 and the workpiece contact element 22. It is not important which portion of the alignment structure resides on the nosepiece 26 and which portion resides on the workpiece contact element 22. In this preferred embodiment, the first alignment mechanism 102 is a groove on the nosepiece 26 and the second alignment structure 108 is a tongue on the workpiece contact element 22.

The preferred embodiment uses a second alignment mechanism to further limit motion of the workpiece contact element 22 relative to the nosepiece 26 when the tool 10 is fired. At least one tab 110 on the housing 91 wraps around to enclose and capture the nosepiece 26, sliding over it as the workpiece contact element 22 is installed.

Initialization of the threaded member 104 into the threadable adjustable mechanism 24 places the tongue 108 below, but in registry with the groove 102. The preferably two tabs 110 are also aligned to slidingly capture the nosepiece 26. As the threaded adjusting mechanism 24 is turned, the threaded member 104 is drawn upward, so that the probe 92 approaches the exit of the channel 34, the nosepiece 26 is received by the housing 91 and tabs 110 and the tongue 108 approaches the groove 102. Continued rotation of the barrel 103 draws the tongue 108 into the groove 102. This mounting mechanism holds the workpiece contact element 22 securely in place, horizontal motion being severely limited by the tongue 108 and the groove 102, as well as the tabs 110, while vertical motion in limited by the engagement of the threaded member 104 in the threaded adjusting mechanism 24.

The relationship between all elements of this invention is understood when converting the tool 10 from use of the first type fastener 20 to the second type fastener.

It is to be understood that changing of the workpiece contact element 22 and the magazine 36 can be done in any order.

Referring to FIGS. 1, 3 and 7, a standard workpiece contact element (not shown), which is identical to the work contact element 22 except that it lacks the probe 92 and the pivot pin 94, is removed from the tool 10 by turning the barrel 103 of the threadable adjustable mechanism 24 in a direction to lower and eventually disengage the threaded member 104. After removal of the workpiece contact element 22 used with the first fastener, the workpiece contact element with the probe 92 is placed with the threaded member 104 aligned in the threadable adjustable mechanism 24 and the adjusting mechanism is turned to engage the threads 106. Additional turning of the adjusting mechanism 24 draws the workpiece contact element 22 upward, capturing the nosepiece 26 with the tabs 110 and engaging the tongue 108 in the groove 102.

Figure 5:
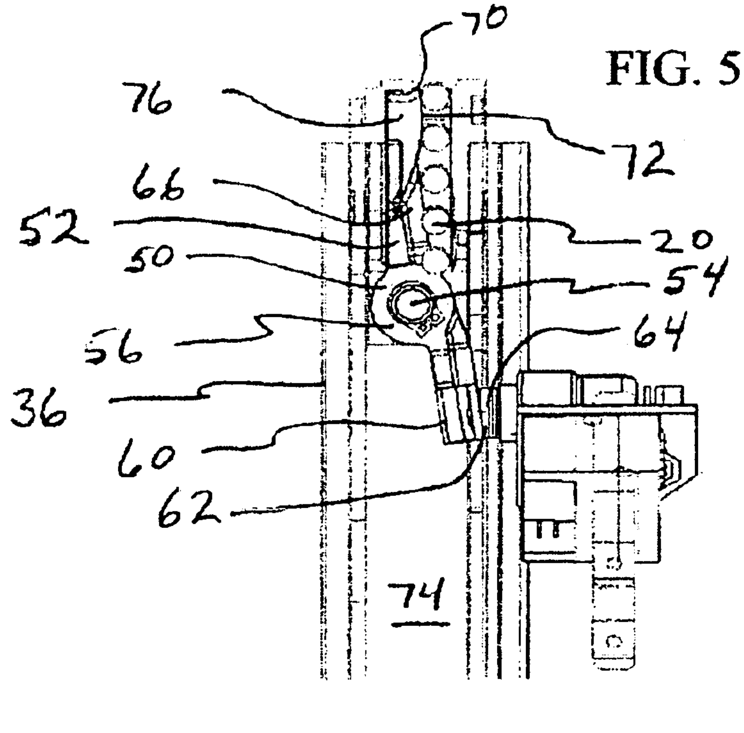
FIG. 5 is a top view of the magazine and sensor of FIG. 4 with the lever in the second position.

Now referring to FIGS. 4 and 5, prior to installation of the magazine 36 of this invention, the second type of fasteners the 20 are loaded into the magazine. As the fasteners 20 move through the interior of the magazine 36, the fasteners pass the detector 50. If the long fasteners 20 are loaded into the magazine 36, they pass over the actuating arm 60, but are pressed against the positioning face 72 of the sensing arm 66, causing it to rotate about the pivot pin 54. Rotation of the sensing arm 66 in direction A causes the actuating arm 60 to rotate in direction B, depressing the button 64. As soon as the button 64 is depressed, the signal to the controller 81 (FIG. 2) tells it to maintain fill primary power during firing.

Referring now to FIGS. 2 and 4, if short fasteners 20 are loaded, the detector 50 does not move due to the length of the fasteners and the button 64 is not depressed. The signal to the controller 81 initiates steps reduce secondary power to the fan 41 while the air and fuel are being mixed in the combustion chamber 16. As the fan 41 starts up, the controller 81 applies secondary power to the fan 41 in short bursts. Between the bursts, the controller 81 reads the ADC 88 to determine the voltage of the motor 12, thereby determining the present speed of the fan. If the fan 41 has not reached the target speed, the controller 81 again applies secondary power and checks the fan speed. When the fan 41 attains the target speed, it is maintained at that speed by the pulse width modulation of the secondary power to the fan until the tool 10 is fired.

Following firing, the fan 41 is returned to full secondary power to evacuate the combustion gases from the combustion chamber 16. The fan 41 is held at full secondary power for up to 5 seconds, then the fan is reduced to low speed. If the workpiece contact element 22 is engaged prior to reduction of fan speed, the braking system 84 is immediately engaged to slow the fan speed to the target speed.

Referring to FIGS. 1, 2 and 4, a method of driving the fasteners 20 into the workpiece 32 begins by passing the fasteners 20 past the detector 50 in the magazine 36. The detector 50 identifies the length of the fastener 20 and activates the sensor 64 to produce or change a signal. In one embodiment, the detector 50 is biased in the first position, but rotates to a second position if the fasteners 20 are at least a predetermined length. Rotation of the lever 52 depresses a button 64 when the lever moves from the first position to the second position. The sensor 64 is produced having a first value when the button is not depressed and the signal is a second value when the button 64 is depressed. After passing the detector, the fasteners 20 are urged through the magazine 36 to the channel 34.

Pressing the tool 10 to the workpiece 32 engages the workpiece contact element 22, causing fuel to be introduced into the combustion chamber 16. The primary power from the combustion chamber 16 is varied in relation to the signal, causing the driving of the fastener 20 into the workpiece 32 at a primary power relative to the length of the fastener. Following combustion of the fuel, the primary power is returned to full power and purging combustion gases from the combustion chamber.

Variation in the primary power can be caused by varying the secondary power to a fan 41 from a secondary power source 42, changing the speed of the fan and creating turbulence in the vicinity of a combustion chamber 16. The secondary power to the fan 41 is suitably varied by executing programming with an electronic controller 81. The programming includes an instruction set that includes reducing the speed of the fan 41, maintaining the reduced speed until the driving of the fastener 20 and returning the fan to full speed following the driving of the fastener.

Varying of the fan speed suitably includes additional options. The braking system 84 is optionally applied to the fan 41, such as activating the transistor 86 wired across the fan motor to short it. Maintaining the reduced fan speed is done by modulating pulses of secondary power to the fan 41, by reducing the voltage or by selecting between a plurality of selectively grounded resistances, by use of photoelectric switches, or by mechanical linkages. Preferably, the modulating step is adjusted as the battery 42 is discharged.

While a particular embodiment of the present system for varying power when driving a fastener with a power tool has been shown and described, it will be appreciated by those skilled in the art that changes and modifications may be made thereto without departing from the invention in its broader aspects and as set forth in the following claims.

What is claimed is:

1. A power framing tool for driving fasteners and having a nosepiece, comprising:

a housing;

a combustion chamber held within said housing that produces primary power;

a fastener supply attached to said housing for supplying the fasteners;

at least one detector that detects a condition and produces a signal based on the condition, said detector being biased to a first position and rotating to a second position when the fasteners are at least a predetermined length; and a means for varying said primary power in relation to said signal prior to driving of the fastener and returning it to full power following driving of the fastener.

2. The apparatus of claim 1 wherein said detector is configured to detect a fastener condition or an environmental condition.

3. The detector of claim 1 wherein said detector is at least one of the group consisting of a mechanical detector, a recoil detector, an optical detector, an infrared detectors, a magnetic detector, and a sonic detector.

4. The apparatus of claim 1 further comprising a channel through which fasteners are fired, and wherein said detector is configured to detect at least one of the group consisting of the fastener type, the fastener length, the fastener width, the point style, the head design, the presence of a coating, the presence of rings on the fastener shank, the shank shape, a bar code and the absence of a fastener from said channel.

5. The apparatus of claim 1 wherein said detector is configured to detect fasteners of different predetermined lengths.

6. The apparatus of claim 1 further comprising a sensor and wherein said signal is a first value when said sensor is not activated and said signal is a second value when said sensor is activated, and wherein said detector activates said sensor when said detector moves from said first position to said second position.

7. The apparatus of claim 1 further comprising a secondary power source controlled by said means for varying said primary power.

8. The apparatus of claim 1 wherein said fastener supply is removably attachable to said housing.

9. The apparatus of claim 1 wherein said means for varying primary power comprises an electronic controller configured for varying said primary power after engagement of said workpiece contact element with the workpiece but prior to combustion and returning said primary power to full power following combustion.

10. The apparatus of claim 9 wherein said electronic controller is configured for varying said primary power by varying the speed of a fan.

11.The apparatus of claim 10 wherein said electronic controller is configured for varying said fan speed by pulse modulation.

12. The apparatus of claim 10 wherein said electronic controller is configured for varying said fan speed by varying voltage or resistance.

13. The apparatus of claim 10 further comprising a braking system for quickly reducing the speed of said fan.

14. The apparatus of claim 13 wherein said fan further comprises a fan motor and said braking system comprises a system for introducing a low resistance sufficient to provide braking action in said fan motor.

15. The apparatus of claim 1 wherein said fastener supply is removably attachable to said housing.

16. A power framing tool for driving fasteners and having a nosepiece, comprising:

a housing;

a combustion chamber held within said housing that produces primary power;

a fastener supply attached to said housing for supplying the fasteners;

at least one detector configured for detecting the length of the fastener and producing a signal based on the fastener length, said detector being one of a mechanical detector, a recoil detector, a magnetic detector, and a sonic detector; and a means for varying said primary power in relation to said signal prior to driving of the fastener and returning it to full power following driving of the fastener.

17. The apparatus of claim 16 wherein said combustion chamber comprises a fan and said means for varying power further comprises a braking system for quickly reducing the speed of said fan.

18. The apparatus of claim 17 wherein said braking system comprises a system for introducing a low resistance sufficient to provide braking action in said fan motor.

* * * * *

UNITED STATES PATENT AND TRADEMARK OFFICE
Certificate

Patent No. 6,796,476 B2

Patented: September 28, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Daniel J. Birk, McHenry, IL (US); Paul D. Paluck, Orland Park, IL (US); Ted Singer, Barrington Hills, IL (US); Michael A. Reinhart, Lake Villa, IL (US); and Yury Shkolnikov, Glenview, IL (US).

Signed and Sealed this Twenty-second Day of April 2008.

RINALDI I. RADA
*Supervisory Patent Examiner*
Art Unit 3721